United States Patent

Kwok et al.

[11] Patent Number: 6,057,059
[45] Date of Patent: May 2, 2000

[54] SURFACE RECRYSTALLIZATION OF LEAD-ALLOY GRID

[75] Inventors: Wellington Y. Kwok; Ronald David Brost, both of Fishers, Ind.; Lawrence Bruce Plant, Milford, Mich.

[73] Assignee: General Motors Corporation, Detroit, Mich.

[21] Appl. No.: 09/034,488

[22] Filed: Mar. 4, 1998

[51] Int. Cl.[7] .............................. H01M 4/80; H01M 4/74
[52] U.S. Cl. ...................... 429/235; 429/233; 429/245; 429/234
[58] Field of Search ...................... 429/233, 241, 429/242, 245; 428/222, 298, 368; 29/2

[56] References Cited

U.S. PATENT DOCUMENTS

| | | | |
|---|---|---|---|
| 4,228,580 | 10/1980 | Matter | 29/527.7 |
| 4,279,977 | 7/1981 | Matter | 429/245 |
| 4,805,277 | 2/1989 | Asuda et al. | 29/2 |
| 4,978,601 | 12/1990 | Kim et al. | 429/245 |
| 5,858,575 | 1/1999 | Chen | 429/245 |

Primary Examiner—Maria Nuzzolillo
Assistant Examiner—Mark Ruthkosky
Attorney, Agent, or Firm—Margaret A. Dobrowitsky

[57] ABSTRACT

Melting and recrystallizing the surfaces of a wrought Pb—Ca—Sn alloy strip from which positive Pb-acid storage battery grids are punched or expanded. The alloy also contains an alloyant such as silver which, upon recrystallization, provides a higher concentration of alloyant-rich grain boundaries on the surface of the grid than the wrought grid for enhancing the conductivity of any oxidation layer formed on the surface of the grid during high temperature cycling of the battery.

22 Claims, 1 Drawing Sheet

SURFACE RECRYSTALLIZATION OF LEAD-ALLOY GRID

TECHNICAL FIELD

The present invention relates to "maintenance-free" lead-acid storage battery grids, and more particularly to a technique for modifying the grain microstructure on the surface of a wrought lead-calcium-tin strip used to form positive grids, such that, corrosion-wise, the wrought grid functions like a grid that is cast from the same alloy.

BACKGROUND OF THE INVENTION

Lead-acid storage batteries comprise several cell elements each encased in separate compartments of a container containing sulfuric acid electrolyte. Each cell element comprises at least one positive electrode, at least one negative electrode, a porous separator (i.e., a thin microporous sheet and/or absorbent glass mat) therebetween. The electrodes each comprise a reticulated lead (including lead alloys) substrate, called a grid, which supports an electrochemically active material thereon, and conducts electrical current throughout the electrode. The active material comprises a leady material (i.e., PbO, $PbO_2$, Pb or $PbSO_4$ at different charge/discharge stages of the battery) pasted onto the grid.

Lead alloys are commonly used as a grid material to provide such properties as stiffness, strength, grain refinement, hardness, corrosion resistance, processability and conductivity. Increased strength and hardness, for example, are attributable to the presence of alloying atoms in the lead that interfere with the movement of dislocations in the crystals. The alloy contains many crystals or grains that are in various orientations, and are defined by grain boundaries formed during solidification of the alloy. For example, silver atoms in a lead alloy introduce non-uniformities within the crystal lattice which block the movement of dislocations and form a network of silver-rich grain boundaries that pervade the grid and extend to the surface of the grid where they contact the active material.

Antimony-free alloys, such as lead-calcium-tin alloys, and lead-calcium-tin-silver alloys, are known for use in so-called "maintenance-free" lead-acid batteries. Elimination of the antimony prevents electrolytic decomposition of the electrolyte and consequent gassing of the battery. Gassing results in a loss of electrolyte from the battery, and requires periodic additions of water over the life of the battery. Pb—Ca—Sn—Ag alloys have been used for positive grids in maintenance-free batteries and may comprise, by weight, about 0.025% to about 0.2% Ca, about 0.1% to about 2.5% tin, about 0.015% to about 1.5% silver, and may contain a some (e.g., about 0.005–0.01%) aluminum to prevent calcium loss during melting. The alloy may be (1) cast directly into grids, (2) cast into strips which are subsequently punched or expanded directly into grids, or (3) cast into ribbons (e.g., 3.5 in wide×⅝ to 2 in. thick) which are rolled in a rolling mill to form wrought alloy strips (e.g., 3.5 in. wide×0.034–0.050 in. thick) which are subsequently punched or expanded into grids.

Cast lead alloy grids are well known in the art and provide a microstructure characterized by a plurality of conjoined irregular polyhedral grains that meet one another at a grain boundary. The grain dimensions range between about 0.025 mm to about 0.100 mm with a maximum length to height aspect ratios between 1.0 to 4.0. The major axes of the grains are not aligned due to any particular manufacturing process (e.g., rolling), and there will be about 200 to about 1000 grains per square millimeter on the grid surface contacting the active material. Certain cast alloy grids (e.g., lead-calcium-tin-silver) are known to promote good adhesion with the active material as well as provide a conductive oxide layer between the grid and the active material, apparently by providing a conductive network throughout the oxide that corresponds to the original grain boundary network of the cast metal. This good adhesion and conductive network is believed to contribute substantially to the extended high-temperature (i.e., 75° C.) cycle life obtained with such grids, as determined by the SAE J240B test regimen.

Lead-acid batteries have also been made from wrought lead-calcium-tin alloys which are expanded to form the grid. Ribbons of the alloy are cast (e.g., drum cast or pulled from a pull box) and fed into a rolling mill for rolling into strips which are anywhere from about 20 to 60 times thinner than the thickness of the starting ribbon. The rolling produces flat and elongated grains that are longitudinally aligned in the direction of rolling. These elongated grains typically have a length of about 0.5 mm to about 5 mm, a width (i.e., in the plane of the strip) of about 0.025 mm to about 0.100 mm, and a thickness (i.e., in the direction of the thickness of the strip) of about 0.001 mm to about 0.005 mm. Lead-acid batteries having positive electrodes made from wrought lead-calcium-tin alloys typically have a longer SAE J240B ambient temperature (i.e. $\leq 40°$ C.) cycle life than those made from grids cast from the same alloy. This is due to the excellent ambient temperature corrosion resistance of the wrought alloy which is characterized by grains which are large and flat (i.e., in the direction of rolling) with fewer inter-granular boundaries at the surface of the grid (see FIG. 1). Wrought grids, however, are relatively short-lived as determined by high-temperature (i.e., 75° C.) life cycle test (i.e., SAE J240B) owing to corrosion of the grid surfaces which forms an electrically resistive layer (see FIG. 2) between the active materials and the grid, and seemingly reduces the electrical and physical connectivity between the active material and the grid. In this regard, it is believed that the rolling of the alloy in the rolling mill so reduces the number of silver-rich grain boundaries at the surface that when a corrosion layer forms it is more electrically insulating than if there were a higher concentration of grain boundaries at the surface as would occur in grids made from cast alloys of the same composition. In this regard, the rolling operation extends the surface of the strip by the same amount as its thickness is reduced (i.e., 20:1–60:1) which correspondingly decreases the number of grain boundaries that are present per unit surface area of the strip. Typically, a wrought strip will have only about 5 to about 100 grains per square millimeter, and a corresponding number of grain boundaries.

SUMMARY OF THE INVENTION

The process aspect of the present invention provides a maintenance-free battery whose positive grids have much of the strength of a wrought grid but with the long term SAE J240B high temperature cycle life of grids cast from the same alloy. In accordance with the present invention, a ribbon of lead-calcium-tin alloy is first cast (e.g., from a pull box or a drum). The Pb—Ca—Sn alloy also contains a conductivity enhancing alloyant which is either an oxidation-resistant metal or a metal whose oxide is electrically conductive, and which produces an as-cast microstructure comprising a plurality of unaligned polyhedral grains defined by a network of conductive grain boundaries which are richer in the alloyant than the grains. The as-cast grain dimensions range between about 0.025 mm to about 0.100 mm with maximum length to height aspect ratios between 1.0 to 4.0. The alloyant preferably comprises silver. The ribbon is then rolled to produce a wrought strip having first and second opposing major surfaces, and a thickness of about 0.030 in. to about 0.050 in. The rolling causes the grains of the alloy to elongate and align themselves generally in the direction of rolling, and reduces the concentration of the grain boundaries on the surface of the strip by more than 10×. These elongated grains typically have a length of about 0.5 mm to about 5 mm, a width (i.e., in the plane of the strip) of about 0.025 mm to about 0.100 mm, and a thickness (i.e., in the direction of the thickness of the strip) of about 0.001 mm to about 0.005 mm. The wrought strip will have only about 5 to about 100 grains per square millimeter.

Following rolling, at least one, and preferably both, surface(s) of the wrought strip is (are) then melted to a depth of less one half the thickness of the strip, and preferably only up to about 0.005 in. or so from the surface. Melting will preferably take place on one surface of the strip at a time, and most preferably while the other opposing surface is kept cool to prevent the entire strip from melting through. The melted layer is then resolidified to recrystallize the surface layer into a microstructure akin to the as-cast ribbon (i.e., prior to rolling). When both sides of the strip are melted and resolidified, the finished strip will have an unrecrystallized, wrought central core sandwiched between two melted, resolidified and recrystallized surface layers having microstructures described above. The strip will retain much of the strength and internal hardness of the wrought alloy in the center of the strip while providing a softer surface which has all of the conductivity and active material bonding benefits of cast alloys having the same composition. Lead-calcium-tin-silver alloys are most preferred, and preferably comprise about 0.070 wt. % to about 0.090 wt. % calcium, about 0.5 wt. % to about 1.0 wt. % tin, and about 0.015 wt. % to about 0.1 wt. % silver. These Pb—Ca—Sn—Ag alloys are seen to have the longest high temperature J240B service life. The strips will preferably be cooled during melting of the surface layer(s) by contacting the surface opposite the surface being melted with a cooling means such as a heat exchanger, coolant, or other means for extracting heat from the strip through the unmelted surface thereof. Preferably, an undersurface of the strip will engage an outer surface of a cooling drum while the upper surface of the strip is being melted and resolidified. Alternatively, the strip may be carried by a belt which is cooled to extract heat from the strip. The belt may be impervious (e.g., stainless steel) onto which a liquid coolant is sprayed, or permeable (e.g., perforated stainless steel, wire mesh, etc.) through which air is blown directly onto the unmelted surface of the strip during melting of the other surface.

The process of the present invention produces a wrought grid having long term high temperature J240 performance resulting from the formation of strong conductive pathways between the active material and the grid metal even in the presence of substantial interfacial corrosion. These pathways comprise a conductive network throughout the interfacial corrosion layer, which network is formed by the conductive alloyant(s), or their conductive oxides, that had concentrated at the grain boundaries of the resolidified layer, and now pervade the oxide corrosion layer formed on the surface of the grid.

BRIEF DESCRIPTION OF THE DRAWINGS

The invention will be better understood when considered in the light of the following detailed description of a preferred embodiment thereof which is given hereafter in conjunction with the several drawings of which.

DESCRIPTION OF THE PREFERRED EMBODIMENT

Figure 1:
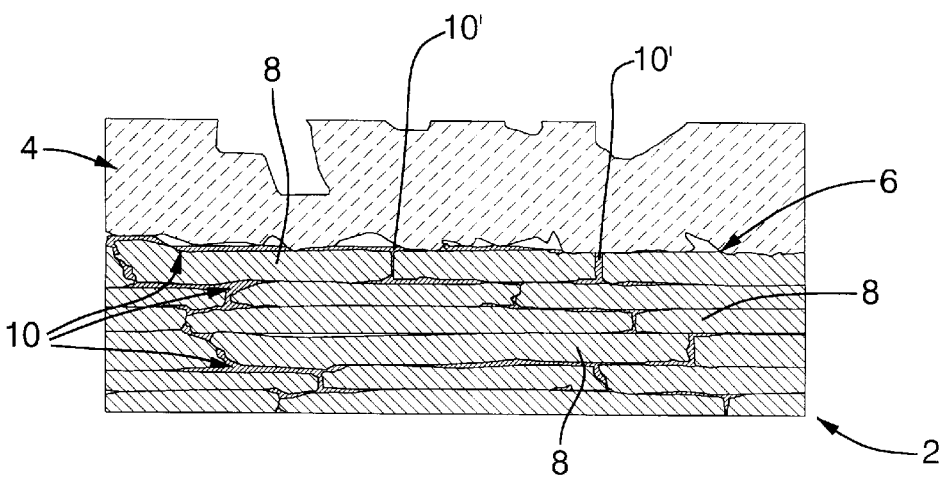
FIG. 1 is an illustration of a magnified cross section of one half of a wrought battery grid pasted with active material before bring subjected to high temperature cycling.

One aspect of the present invention contemplates a method for modifying the microstructure of the surface(s) of a wrought lead alloy grid to provide prolonged high temperature cycle life benefits normally otherwise found in cast grids. While the invention will hereinafter be discussed in conjunction with the use of lead-calcium-tin-silver alloys, it is to be understood that it is equally applicable to other lead alloys containing conductivity-enhancing metal alloyant(s) that concentrate at the grain boundaries and is (are) either corrosion resistant (i.e., do not oxidize in the battery environment), or to oxidize but produce an electrically conductive oxide. Such alloyants include silver, and tin. A lead-calcium-tin-silver alloy is cast into a ribbon having a thickness of about 5/8 in. to about 2.0 in. (preferably about 1.0 in.) and a width of about 3.0 in. to about 4.0 in. (preferably about 3.5 in.). The ribbon may be cast by any conventional strip casting technique known to those skilled in the art, such as drum casting, pull-box casting, or other vertical or horizontal continuous casting techniques known in the metal casting art. The ribbon is then fed into to a multi-pass rolling mill, or the like, to mechanically work the ribbon to widen and reduce its thickness. For example, a 3.5 in. wide ribbon having a 1.0 in. thickness is rolled into a strip that is 3.5 in. wide by 0.034 in. thick. At least one surface layer of the wrought strip produced by the rolling mill is then subjected to localized melting to a depth less than ½ the thickness of the strip and preferably only up to about 0.005 in or so deep. Melting may be achieved by locally heating portions of the strip as for example by induction, laser, gas flame, infrared, electron-beam, plasma, hot filament or other non-invasive heating/melting techniques known to those skilled in the art. If gas flame heating is used, the gas will preferably comprise a reducing gas, such as $H_2$, to preclude unwanted oxidation of the melted surface. A continuous strip of the wrought lead alloy will move by the heating/melting device at a suitable rate commensurate with the melting point of the alloy being used, the depth of melting sought, and the type of the heating/melting device being used.

According to one embodiment of the invention, a high frequency, alternating current induction coil surrounds the strip for melting both sides of the strip at the same time. Alternatively, two separate coils are used with one of the coils positioned adjacent one surface of the lead strip and another similar coil positioned adjacent the opposite surface of the strip (e.g., above and below the moving strip). As the strip moves between the coils, rapidly changing magnetic flux induces large eddy currents in the surface of the strip, and causes melting thereof. Preferably however, a two-stage surface melting technique is utilized. In the first stage, the selected heating device (e.g., induction coil) is located directly above the top surface of the wrought grid while a cooling device (e.g., heat exchanger) is located directly below the bottom surface of the wrought grids to extract heat from the strip through the surface that is not being melted.

The top surface can then be heated to the melting temperature of the alloy while the bottom surface of the wrought strip is kept sufficiently cool to prevent excessive melting of the strip. The strip should be kept sufficiently cool as to insure that less than half the thickness of the strip is melted so as to preserve at least some of the wrought layer. Upon exiting from this first stage, the molten layer of alloy on the top surface of the wrought grids rapidly solidifies to produce a microstructure like that of the unwrought ribbon in its as-cast condition. Thereafter in a second stage, located a short distance downstream from the first stage, a similar heating device is located directly below the bottom surface of the strip, while the upper surface of the strip is cooled to prevent untoward melting of the wrought core. Surface tension effects will prevent the thin film of molten metal from falling from the strip prior to its resolidification. Otherwise, the strip may be turned over before melting the second surface layer, and the now upper layer melted in the same manner as in the first stage (i.e., with an underlying cooling device).

Cooling one of the strip's surfaces while the other is being melted can be accomplished in a number of ways. In one embodiment, the strip will wrap itself partially around a rotating heat exchanger, such as a cooling drum, which is located opposite the heating device, as the strip advances down the production line. The drum may be a large mass that absorbs the heat extracted from the strip, but will preferably be a liquid cooled drum for better temperature control. According to one embodiment of the invention, the drum will be hollow having an outer wall which has an inside surface and an outside surface. The strip engages a portion (e.g., about 20%) of the outside surface of the drum while coolant (e.g., water) is sprayed onto the inside surface. Alternatively, the strip may be laid onto a moving belt and coolant (e.g., forced air, water, etc.) directed against the opposite side of the belt to extract heat from the strip. Hence for example, the belt may comprise impervious stainless steel with water being sprayed onto the belt at, and downstream of, the heating/melting device. Alternatively, the belt may comprise a perforated or woven belt through which coolant (e.g., air) is blown to extract sufficient heat from the strip to prevent excessive melting (e.g., too deep) of the strip.

Another aspect of the present invention contemplates a maintenance-free lead-acid storage battery having a plurality of positive polarity electrodes including a leady active material supported on a lead alloy grid made in accordance with the process of the present invention. In this regard, the grid alloy comprises lead-calcium-tin plus at least one alloyant selected from the group consisting of oxidation-resistant metals and metals that form electrically conductive oxides. Suitable such metals are seen to include silver (most preferred), and arsenic. The grid has a first layer of the alloy adjacent the leady active material, which layer has essentially a cast microstructure characterized by a plurality of substantially unaligned, conjoined, grains having a network of grain boundaries between the grains that are richer in the alloyant than the grains themselves, which grains (a) range in size from about 0.025 mm to about 0.100 mm, (b) have a density on the surface of the grid confronting the active material of about 200 to about 1000 grains per square millimeter, and (c) have an aspect ratio between about 1 and 4. The grid also has a second layer underlying the first layer and characterized by a plurality of aligned, flattened, elongated, mechanically worked grains having a length of about 0.5 mm to about 5 mm, a width of about 0.025 mm to about 0.100 mm, a thickness of about 0.001 mm to about 0.005 mm, and a density of about 5 to about 100 grains per square millimeter (i.e., as determined in the principal plane of the rolled strip from which the grid was punched). Most preferably, the grid includes a third layer which has the same microstructure as the first layer, but which is located on the side of the second layer opposite the first layer such that the second layer is sandwiched between the first and third layers. Most preferably, the first and third layers are only up to about 0.005 in. thick, but could have a thickness which is less than ½ the thickness of the strip such that a distinct wrought, second layer remains after resolidification occurs.

Figure 2:
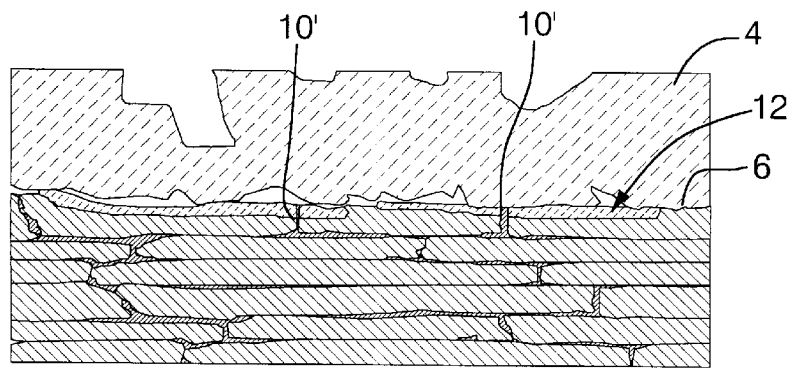
FIG. 2 is an illustration of the grid of FIG. 1 after high temperature cycling.
Figure 3:
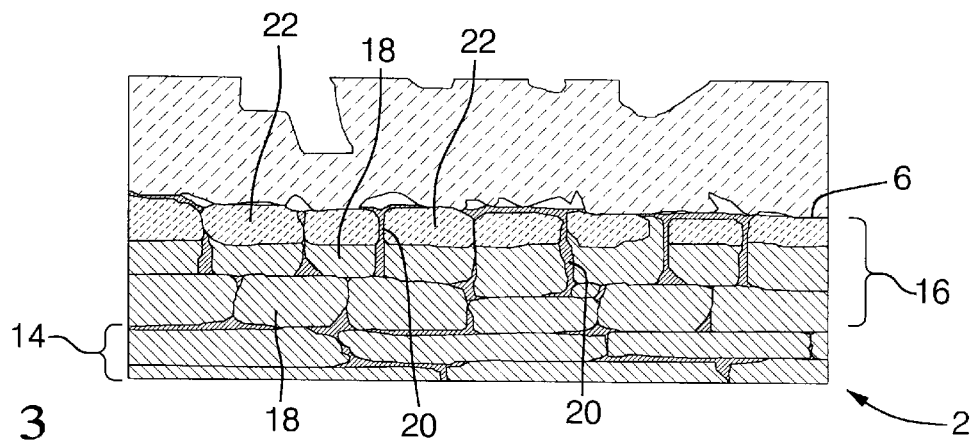
FIG. 3 is an illustration of a magnified cross section of one half of a grid made according to the present invention.

FIG. 1 illustrates a wrought (i.e., rolled) grid 2, before cycling and having a leady active material 4 pasted on one surface 6 thereof. The grid includes a plurality of grains 8 elongated in the direction of rolling and grain boundaries 10 at the junctions between the several grains 8. Relatively few grain boundaries 10' extend to the surface 6 and contact the active material 4. FIG. 2 illustrates the pasted grid of FIG. 1, after high temperature cycling, and shows that the grains 8 on the surface 6 of the grid 2 have oxidized and form a layer of oxide 12 between the active material 4 and the grid 2. On the other hand, the Ag-rich and Sn-rich metal that forms the grain boundaries 10' have either not oxidized or have been converted to a conductive oxide that provides an electrical connection between the active material 4 and the grid 2 through an otherwise insulative oxide layer 12. FIG. 3 illustrates a grid 2 made in accordance with the present invention, and after cycling. FIG. 3 shows a central or core part 14 of the strip (only the upper half, thicknesswise, of the strip is shown) as being mechanically worked, wrought alloy characterized by elongated grains 8. The layer 16 adjacent the surface 6, however, has been melted and resolidified to provide a plurality of unworked grains 18, and a relatively high concentration of grain boundaries 20 extending to the surface 6 of the grid. As shown, the grains 22 at the surface 6 have been oxidized, but the conductive grain boundaries 20 penetrate the oxide, so formed, and continue to provide a high concentration of electrically conductive paths between the active material 4 and the grid 2. Compared to the grid shown in FIG. 3, in FIG. 2 there are relatively few grain boundaries 10' extending through the oxide layer 12 into engagement with the active material 4, and correspondingly relatively low electrical conductivity through the layer 12.

While the invention has been described in terms of certain specific embodiments thereof, it is not intended to be limited thereto, but rather only to the extent set forth hereafter in the claims which follow.

What is claimed is:

1. A method of manufacturing wrought, positive, lead-acid storage battery grids for improved high temperature cycle life of maintenance-free batteries made therefrom, comprising the steps of:

a. casting a ribbon of substantially antimony-free, lead-calcium-tin alloy comprising an alloyant selected from the group consisting of metals which are oxidation-resistant in the presence of sulfuric acid electrolytes in lead-acid batteries and metals which form electrically conductive oxides, said ribbon having an as-cast microstructure comprising a plurality of substantially unaligned, conjoined, grains having a network of grain boundaries between said grains that are richer in said alloyant than said grains, said grains (a) ranging in size from about 0.025 mm to about 0.100 mm, (b) having a density on the surface of said grid confronting said lead containing active material of about 200 to about 1000 grains per square millimeter, and (c) an aspect ratio between about 1 and 4;

b. rolling said ribbon to produce a wrought strip having first and second opposing major surfaces, said rolling causing the grains of said alloy to elongate and align generally in the direction of said rolling;

c. melting a first layer of said alloy at said first major surface, said first layer having a depth which is less than ½ the thickness of said strip;

d. solidifying said first layer to recrystallize said first layer to a microstructure akin to said as-cast microstructure;

e. punching or expanding said strip to form a positive grid for supporting the battery's active material;

f. and extracting heat from said strip through said second surface while melting said first layer to prevent said strip from excessive melting by preventing the entire strip from melting therethrough.

2. A method according to claim 1 including the step of contacting said second surface with a heat exchanger to extract said heat.

3. A method according to claim 1 wherein said first layer is melted to a depth up to about 0.005 in.

4. A method of manufacturing wrought, positive, lead-acid storage battery grids for improved high temperature cycle life of maintenance-free batteries made therefrom, comprising the steps of:

a. casting a ribbon of a lead alloy selected from the group consisting of lead-calcium-tin-silver, said ribbon having an as-cast microstructure comprising a plurality of substantially unaligned, conjoined, grains having a network of grain boundaries between said grains that are richer in said alloyant than said grains, said grains (a) ranging in size from about 0.025 mm to about 0.100 mm, (b) having a density on the surface of said grid confronting said lead containing active material of about 200 to about 1000 grains per square millimeter, and (c) an aspect ratio between about 1 and 4;

b. rolling said ribbon to produce a wrought strip having first and second opposing major surfaces, said rolling causing the grains of said alloy to elongate and align generally in the direction of said rolling;

c. melting a first layer of said alloy at said first major surface, said first layer having a depth which is less than ½ the thickness of said strip;

d. solidifying said first layer to recrystallize said first layer to a microstructure akin to said as-cast microstructure;

e. and punching or expanding said strip to form a positive grid for supporting the batteries active material.

5. A method according to claim 4 including the additional step of melting a second layer at and beneath said second major surface, and solidifying said second layer to a microstructure akin to said as-cast microstructure.

6. A method according to claim 4 including the step of extracting heat from said strip through said second surface while melting said first layer to prevent said strip from excessive melting.

7. A method according to claim 6 including the step of contacting said second surface with a heat exchanger to extract said heat.

8. A method according to claim 7 including the step of passing said strip over a cooling drum to extract said heat.

9. A method according to claim 8 including the step of circulating coolant through said drum to control the temperature of said drum.

10. A method according to claim 9 including the step of spraying said coolant onto the inside surface of an external wall defining a hollow drum.

11. A method according to claim 6 including the step of laying said strip atop a thermally conductive carrier belt, and cooling the underside of said belt to extract said heat from said strip.

12. A method according to claim 11 wherein a cooling fluid is impinged on said underside of said belt to extract said heat.

13. A method according to claim 12 wherein said belt is permeable and said fluid is air.

14. A method according to claim 12 wherein said belt is impermeable and said fluid is a liquid.

15. A method according to claim 14 wherein said liquid is water.

16. A method according to claim 4 including the additional step of melting a second layer at and beneath said second major surface, and solidifying said second layer to a microstructure akin to said as-cast microstructure.

17. A method according to claim 4 including the step of extracting heat from said strip through said second surface while melting said first layer.

18. A method according to claim 17 including the step of contacting said second surface with a heat exchanger to extract said heat.

19. A method according to claim 1 wherein said alloyant comprises silver.

20. A lead-acid storage battery having a plurality of positive polarity electrodes including a lead containing active material supported on a lead alloy grid, said alloy comprising a silver alloyant which concentrates at said alloy's grain boundaries and is selected from the group consisting of metals which are oxidation-resistant in the presence of sulfuric acid electrolyte in lead-acid batteries and metal which form electrically conductive oxides, and said grid having (i) a first layer of said alloy adjacent said lead containing active material and characterized by a plurality of substantially unaligned, conjoined, grains having a network of grain boundaries between said grains that are richer in said alloyant than said grains, said grains (a) ranging in size from about 0.025 mm to about 0.100 mm, (b) having a density on the surface of said grid confronting said active material of about 200 to about 1000 grains per square millimeter, and (c) an aspect ratio between about 1 and 4, and (ii) a wrought second layer underlying said first layer and characterized by a plurality of aligned flattened elongated grains having a length of about 0.5 mm to about 5 mm, a width of about 0.025 mm to about 0.100 mm, a thickness of about 0.001 m to about 0.005 mm, and a density of about 5 to about 100 grains per square millimeter.

21. A battery according to claim 20 including a third layer on the side of said second layer opposite said first layer such that said wrought second layer is sandwiched between said first and third layers, said third layer having the same microstructure as said first layer.

22. A battery according to claim 21 wherein said first and third layers are up to about 0.005 in. thick.

* * * * *